(12) United States Patent
Susnjara et al.

(10) Patent No.: US 10,569,523 B2
(45) Date of Patent: Feb. 25, 2020

(54) METHODS OF SECURING AN INITIAL LAYER DURING ADDITIVE MANUFACTURING OF THERMOPLASTIC MATERIAL

(71) Applicant: Thermwood Corporation, Dale, IN (US)

(72) Inventors: Kenneth Susnjara, Birdseye, IN (US); Scott Vaal, Jasper, IN (US)

(73) Assignee: Thermwood Corporation, Dale, IN (US)

( * ) Notice: Subject to any disclaimer, the term of this patent is extended or adjusted under 35 U.S.C. 154(b) by 399 days.

(21) Appl. No.: 15/373,660

(22) Filed: Dec. 9, 2016

(65) Prior Publication Data

US 2017/0282461 A1 Oct. 5, 2017

Related U.S. Application Data

(63) Continuation-in-part of application No. 15/090,819, filed on Apr. 5, 2016.

(51) Int. Cl.
*B29C 64/118* (2017.01)
*B33Y 10/00* (2015.01)
(Continued)

(52) U.S. Cl.
CPC .......... *B33Y 10/00* (2014.12); *B29C 64/118* (2017.08); *B29C 64/209* (2017.08);
(Continued)

(58) Field of Classification Search
CPC ........... B29C 67/0055; B29C 67/0088; B29C 64/118; B29C 64/245
See application file for complete search history.

(56) References Cited

U.S. PATENT DOCUMENTS

| | | | | |
|---|---|---|---|---|
| 5,121,329 A | * | 6/1992 | Crump | ................... B22F 3/115 700/119 |
| 7,731,816 B2 | | 6/2010 | Oldani et al. | |

(Continued)

FOREIGN PATENT DOCUMENTS

| | | |
|---|---|---|
| WO | 2015/149054 A1 | 10/2015 |
| WO | WO 2016/088042 A1 | 6/2016 |

OTHER PUBLICATIONS https://reprap.org/forum/read.php?1,38932,38968#msg-38968 (regarding the use of plastic powder to improve adhesion) (Year: 2010).*

(Continued)

*Primary Examiner* — Leith S Shafi
*Assistant Examiner* — Nicholas R Krasnow
(74) *Attorney, Agent, or Firm* — Bookoff McAndrews, PLLC (57) ABSTRACT

In one embodiment, an additive manufacturing method including the steps of positioning a removable surface on a worktable; applying an adhesive material to the removable surface; depositing a plurality of pellets into the adhesive material, wherein at least a portion of each pellet of the plurality of pellets remains exposed; depositing a first plurality of layers of a flowable material on at least some of the plurality of pellets; and depositing a second plurality of layers of the flowable material on the first plurality of layers.

16 Claims, 6 Drawing Sheets

(51) Int. Cl.
  *B29C 64/245* (2017.01)
  *B29C 64/209* (2017.01)
  *B29C 64/393* (2017.01)
  *B33Y 30/00* (2015.01)
  *B33Y 50/02* (2015.01)
  *B29K 101/12* (2006.01)
  *B29K 105/12* (2006.01)

(52) U.S. Cl.
  CPC .......... *B29C 64/245* (2017.08); *B29C 64/393* (2017.08); *B33Y 30/00* (2014.12); *B33Y 50/02* (2014.12); *B29K 2101/12* (2013.01); *B29K 2105/12* (2013.01); *B29K 2911/14* (2013.01)

(56) References Cited

U.S. PATENT DOCUMENTS

| | | | |
|---|---|---|---|
| 7,810,539 | B2 | 10/2010 | Mischler et al. |
| 8,151,854 | B2 | 4/2012 | Oldani |
| 8,534,338 | B2 | 9/2013 | Oldani et al. |
| 8,954,180 | B2 | 2/2015 | Oldani |
| 2007/0044899 | A1 | 3/2007 | Tingley |
| 2008/0006017 | A1 | 1/2008 | Rindels |
| 2010/0200168 | A1 | 8/2010 | Oldani et al. |
| 2014/0371895 | A1* | 12/2014 | Sadusk ............... B33Y 10/00 700/98 |
| 2015/0037527 | A1* | 2/2015 | Jacobs ............... B29C 64/40 428/41.7 |
| 2015/0145169 | A1* | 5/2015 | Liu .................. B33Y 10/00 264/308 |
| 2015/0165666 | A1* | 6/2015 | Butcher ............... D02G 3/22 428/373 |
| 2015/0273757 | A1 | 10/2015 | Pforte et al. |
| 2016/0039152 | A1 | 2/2016 | Hara |
| 2016/0236409 | A1* | 8/2016 | Armani ............... G05B 19/402 |
| 2017/0036403 | A1* | 2/2017 | Ruff .................. B33Y 30/00 |
| 2017/0232761 | A1* | 8/2017 | Pervan ............... B41J 3/28 347/102 |
| 2018/0050502 | A1 | 2/2018 | Oldani |

OTHER PUBLICATIONS blog.think3dprint3d.com/2013/08/plastic-primer-and-abs-adhesion-to.html (regarding the use of spray paint plastic primer as a 3d printing adhesion promoter) (Year: 2013).* https://reprap.org/forum/read.php?4,156005,156955#msg-156955 (regarding the use of sugar as a build bed adhesion promoter) Year: 2012).* https://reprap.org/forum/read.php?1,85237,85334 (regarding the use of rough paper as a build bed) (Year: 2011).* https://reprap.org/forum/read.php?4,121996,134411 (suggesting the use of acrylic floor wax as a build bed material) (Year: 2012).* https://reprap.org/forum/read.php?14,60801,60801 (regarding the use of rough frosted glass as a build bed material) (Year: 2010).*

International Search Report and Written Opinion issued in International Application No. PCT/US2017/022050, dated Jun. 14, 2017 (12 pages).

Office Action for Canadian Application No. 3,016,473, dated Jun. 18, 2019, (4 pages).

* cited by examiner

METHODS OF SECURING AN INITIAL LAYER DURING ADDITIVE MANUFACTURING OF THERMOPLASTIC MATERIAL

CROSS-REFERENCE TO RELATED APPLICATION(S)

This application is a continuation-in-part of pending U.S. patent application Ser. No. 15/090,819, filed Apr. 5, 2016, the entirety of which is incorporated by reference herein.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer-aided design (CAD) model.

A particular type of additive manufacturing is more commonly known as 3D printing. 3D printing techniques and processes generally include forming and extruding a bead of flowable material (e.g., molten thermoplastic), applying such bead of material in a strata of layers to form a facsimile of an article, and machining such facsimile to produce an end product. Such a process is generally achieved by means of an extruder mounted on a computer numeric controlled (CNC) machine with controlled motion along at least the X, Y, and Z-axes. In some cases, the flowable material, such as, e.g., molten thermoplastic material, may be infused with a reinforcing material (e.g., strands of fiber) to enhance the material's strength. The flowable material, while generally hot and pliable, may be deposited upon a substrate (e.g., a mold), pressed down or otherwise flattened to some extent, and leveled to a consistent thickness, preferably by means of a tangentially compensated roller mechanism. The flattening process may aid in fusing a new layer of the flowable material to the previously deposited layer of the flowable material. In some instances, an oscillating plate may be used to flatten the bead of flowable material to a desired thickness, thus effecting fusion to the previously deposited layer of flowable material. The deposition process may be repeated so that each successive layer of flowable material is deposited upon an existing layer to build up and manufacture a desired component structure. When executed properly, the new layer of flowable material may be deposited at a temperature sufficient enough to allow the new layer of flowable material to melt and fuse with a previously deposited layer of flowable material, thus producing a solid part.

In the practice of the aforementioned process, it is necessary to provide a method of securing and holding the first layer of material in a fixed position, as it cools by an amount sufficient enough to allow the printing of subsequent layers. A method sometimes employed, is to provide a foundation sheet of thermoplastic material onto which the newly printed layer can bond. However, while the newly printed material becomes securely bonded to the foundation sheet, a problem frequently develops as the newly deposited material cools, and correspondingly shrinks. Since the newly deposited material is securely bonded to the already cooled and stabilized foundation sheet, the shape of the entire structure becomes distorted due to warpage as the deposited layer shrinks disproportionately relative to the foundation layer onto which it is deposited, and the resultant stress created between the two materials equilibrates. Such distortion frequently results in an unusable product. A method commonly practiced to overcome the warpage problems associated with solidly bonding to a foundation layer, is to deposit the initial layer onto a heated platen installed on the worktable, thus providing for some flexibility in the initial bond. In the practice of such method, the platen maintains the thermoplastic material at a temperature sufficient enough to prevent a substantial solid bonding to the initial layer. However, several disadvantages have been encountered in the application of that method; most notably, a lack of sufficient bonding between the platen and the printed material often results in subsequent movement of the workpiece as subsequent layers of material are applied. Another disadvantage is the substantial financial burden associated with providing a large heated platen.

In view of the forgoing, it is an object of the present disclosure to provide a low-cost method of securely fixing the first layer of a 3D printed thermoplastic part to a worktable top, and holding it securely enough for subsequent processing, while providing for a sufficient amount of flexibility and movement within the bond, to compensate for shrinkage of the workpiece during the cooling process, thus minimizing any warping of the substrate onto which it is deposited. A still further objective of the disclosure is to provide such an improved process and method without the requirement of complex and expensive devices.

SUMMARY

Aspects of the present disclosure relate to, among other things, methods and apparatus for fabricating components via additive manufacturing, such as, e.g., 3D printing techniques. Each of the aspects disclosed herein may include one or more of the features described in connection with any of the other disclosed aspects.

In one embodiment, an additive manufacturing method including the steps of positioning a removable surface on a worktable; applying an adhesive material to the removable surface; depositing a plurality of pellets into the adhesive material, wherein at least a portion of each pellet of the plurality of pellets remains exposed; and depositing a flowable material on at least some of the plurality of pellets.

Embodiments of the additive manufacturing method may include one or more of the following features: the flowable material is a thermoplastic material; each pellet of the plurality of pellets comprises the thermoplastic material; the adhesive material includes polyvinyl acetate glue; the removable surface includes one of medium density fiberboard (MDF) or high grade plywood; the flowable material is heated prior to depositing the flowable material on the plurality of pellets; cooling the flowable material after the flowable material is deposited on the plurality of pellets; depositing the flowable material on the plurality of pellets causes at least one pellet of the plurality of pellets to partially melt; depositing the flowable material includes depositing a plurality of flowable material rows adjacent to one another; the flowable material includes a reinforcing material embedded therein; the reinforcing material includes strands of fiber; depositing a plurality of flowable material rows adjacent to one another includes fusing a row of flowable material to an adjacent previously deposited row of flowable material; the flowable material is deposited from a nozzle of a programmable computer numeric control (CNC) machine; and depositing the flowable material includes depositing the flowable material in a pattern, wherein the pattern is based on a digital representation of a component.

In one embodiment, an additive manufacturing method including the steps of positioning a removable surface on a worktable; applying an adhesive material to the removable surface; depositing a plurality of pellets into the adhesive material, wherein at least a portion of each pellet of the plurality of pellets remains exposed; depositing a first plurality of layers of a flowable material on at least some of the plurality of pellets; and depositing a second plurality of layers of the flowable material on the first plurality of layers.

An additive manufacturing system including a programmable computer numeric control (CNC) machine configured to extrude a flowable material, wherein the programmable CNC machine includes a worktable; and a removable surface positioned on the worktable, wherein the removable surface includes an adhesive material thereon, a plurality of pellets, wherein at least a portion of each pellet is embedded in the adhesive material and at least a portion of each pellet remains exposed, and a first plurality of layers of the flowable material deposited on at least some of the plurality of pellets.

Embodiments of the additive manufacturing system may include one or more of the following features: the computer numeric control (CNC) machine is configured to deposit the flowable material on the plurality of pellets in a pattern based on a digital representation; the programmable computer numeric control (CNC) machine includes a nozzle for extruding the flowable material, and wherein the nozzle is moveable along a first axis, a second axis perpendicular to the first axis, and a third axis orthogonal to the first and second axes, and wherein the nozzle is configured to rotate in a plane defined by the first and second axes; each of the flowable material and the plurality of pellets comprises a thermoplastic material; the adhesive material includes polyvinyl acetate glue; and the removable surface includes one of medium density fiberboard (MDF) or high grade plywood.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating multiple components via additive manufacturing techniques, such as, e.g., 3D printing. More particularly, the methods and apparatus described herein comprise a method for eliminating or otherwise substantially minimizing warping or other deformation in articles produced by an additive manufacturing process. The disclosed methods and apparatus provide a foundation structure with a bonding surface of sufficient elasticity so as to allow for relative movement of built-up thermoplastic layers, independent of the foundation structure, while still maintaining adequate adhesion to said foundation structure. For the purposes of brevity, the methods and apparatus described herein will be discussed in connection with fabricating parts from thermoplastic materials. However, those of ordinary skill in the art will readily recognize that the disclosed apparatus and methods may be used with any flowable material suitable for additive manufacturing, such as, e.g., 3D printing.

One aspect of the present disclosure may be achieved by providing a stable, yet flexible surface onto which molten thermoplastic material may be deposited, with a significantly reduced incident of warping or other deformation during the cooling cycle. Such a surface may be prepared by, for example, flexibly securing (e.g., via bonding) thermoplastic pellets to a stable substructure. The thermoplastic pellets utilized in this method may be substantially similar in composition, geometry, and configuration to that in which thermoplastic material is typically supplied. More particularly, a machine (e.g., a CNC machine) worktable may include a suitable, stable and removable substructure mounted thereon.

In one embodiment of the present disclosure, there is first mounted to the machine worktable, a suitable, stable substructure, the top surface of which is adaptable to the adhesion of a liquid bonding material. Such a substructure may be typically in the form of medium density fiberboard (MDF) or high grade plywood, but other materials also may be suitable. A bonding layer, typically comprising a type of polyvinyl acetate glue (or any other suitable adhesive), may be first applied to the surface of the substructure. Thermoplastic pellets then may be applied to the bonding layer in a more or less evenly distributed pattern. When the bonding material sets, the individual pellets become bonded to the surface of the substructure. Any loose pellets can then be removed in any suitable manner. For example, loose or otherwise unsecured thermoplastic pellets may be removed via suction by a simple shop grade vacuum cleaner. This results in a prepared pellet bed along the path of the first layer to be printed.

When the first layer of molten thermoplastic material is deposited onto the layer of bonded pellets, the bead of hot material fuses to the pellets, holding the printed layer of material firmly in place. The glue, which remains slightly pliable after the curing process, softens and becomes slightly more pliable when heated by the application of molten thermoplastic material; the individual pellets are therefore free to move by an amount sufficient enough to impede the development of any stress between the initial thermoplastic bead and the bonding layer. Correspondingly, the tendency for the structure to distort is significantly reduced. After the printed structure is completely cooled, enough force is applied to the structure to break the glue bond, separating the completed article from the substructure.

Figure 1:
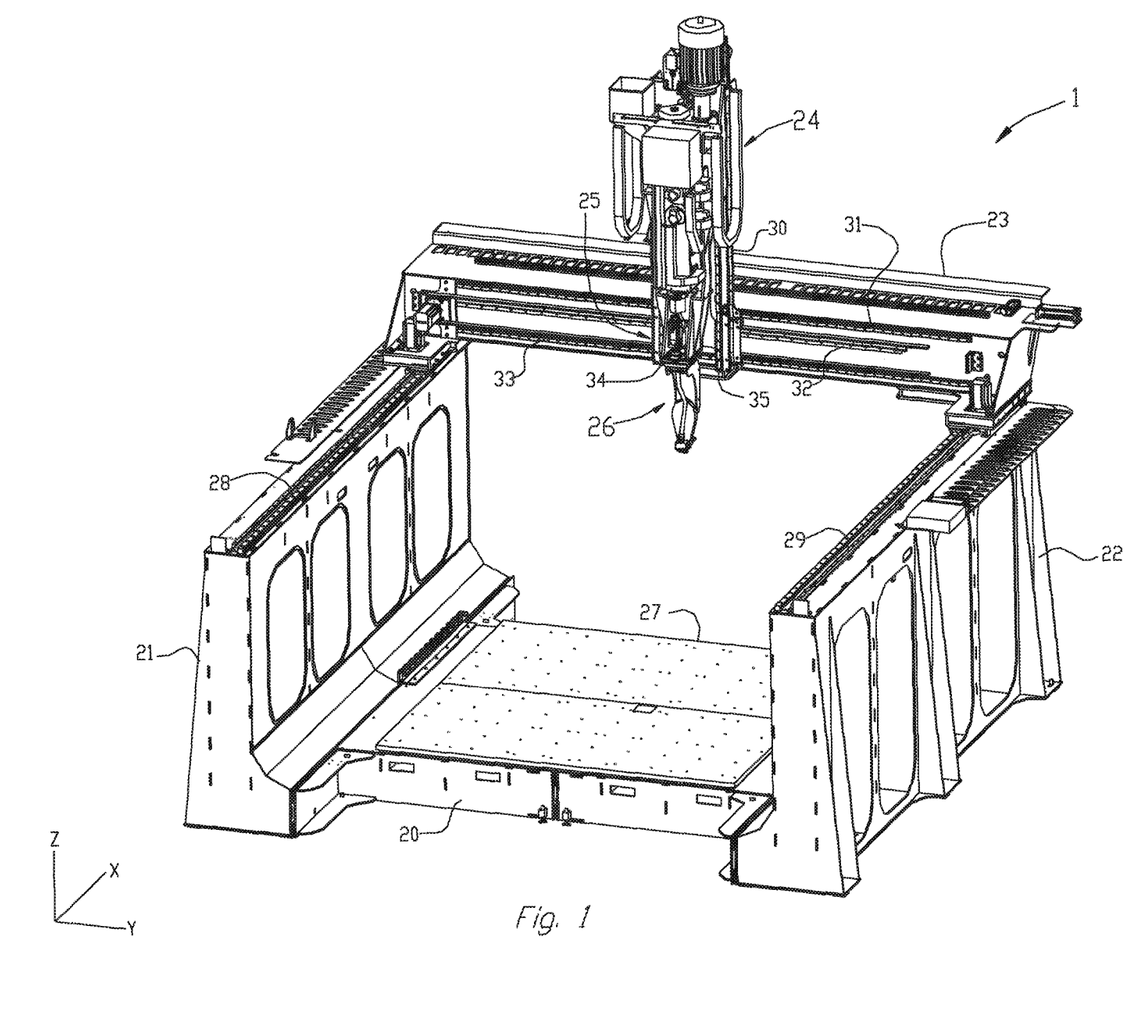
FIG. 1 is a perspective view of an exemplary CNC machine operable pursuant to an additive manufacturing process in forming articles, according to an aspect of the present disclosure.

With reference now to FIG. 1 of the drawings, there is illustrated a programmable computer numeric control (CNC) machine 1 embodying aspects of the present disclosure. A controller (not shown) may be operatively connected to the machine 1 for displacing an application head along a longitudinal line of travel or an x-axis, a transverse line of travel or a y-axis, and a vertical line of travel or a z-axis, in accordance with a program inputted or loaded into the controller for performing an additive manufacturing process to replicate a desired component. CNC machine 1 may be configured to print or otherwise build 3D parts from digital representations of the 3D parts (e.g., AMF and STL format files) programmed into the controller. For example, in an extrusion-based additive manufacturing system, a 3D part may be printed from a digital representation of the 3D part in a layer-by-layer manner by extruding a flowable material. The flowable material may be extruded through an extrusion tip carried by a print head of the system, and is deposited as a sequence of beads on a substrate in an x-y plane. The extruded flowable material may fuse to previously deposited material, and may solidify upon a drop in temperature. The position of the print head relative to the substrate is then incremented along a z-axis (perpendicular to the x-y plane), and the process is then repeated to form a 3D part resembling the digital representation.

Machine 1 includes a bed 20 provided with a pair of transversely-spaced side walls 21 and 22, a gantry 23 supported on side walls 21 and 22, carriage 24 mounted on gantry 23, a carrier 25 mounted on carriage 24, and an applicator assembly 26 mounted on carrier 25. Supported on bed 20 between side walls 21 and 22 is a worktable 27 provided with a support surface disposed in an x-y plane, which may be fixed or displaceable along an x-axis. In the displaceable version, the worktable may be displaceable along a set of rails 28 and 29 mounted on the bed 20 by means of servomotors and rails 28 and 29 mounted on the bed 20 and operatively connected to the worktable 27. Gantry 23 is disposed along a y-axis, supported at the ends thereof on end walls 21 and 22, either fixedly or displaceably along an x-axis on a set of guide rails 28 and 29 provided on the upper ends of side walls 21 and 22. In the displaceable version, the gantry 23 may be displaceable by a set of servomotors mounted on the gantry 23 and operatively connected to tracks provided on the side walls 21 and 22 of the bed 20. Carriage 24 is supported on gantry 23 and is provided with a support member 30 mounted on and displaceable along one or more guide rails 31, 32 and 33 provided on the gantry 23. Carriage 24 may be displaceable along a y-axis on one or more guide rails 31, 32 and 33 by a servomotor mounted on the gantry 23 and operatively connected to support member 30. Carrier 25 is mounted on a set of spaced, vertically disposed guide rails 34 and 35 supported on carriage 24 for displacement of the carrier 25 relative to the carriage 24 along a z-axis. Carrier 25 may be displaceable along the z-axis by a servomotor mounted on carriage 24 and operatively connected to carrier 25.

Figure 2:
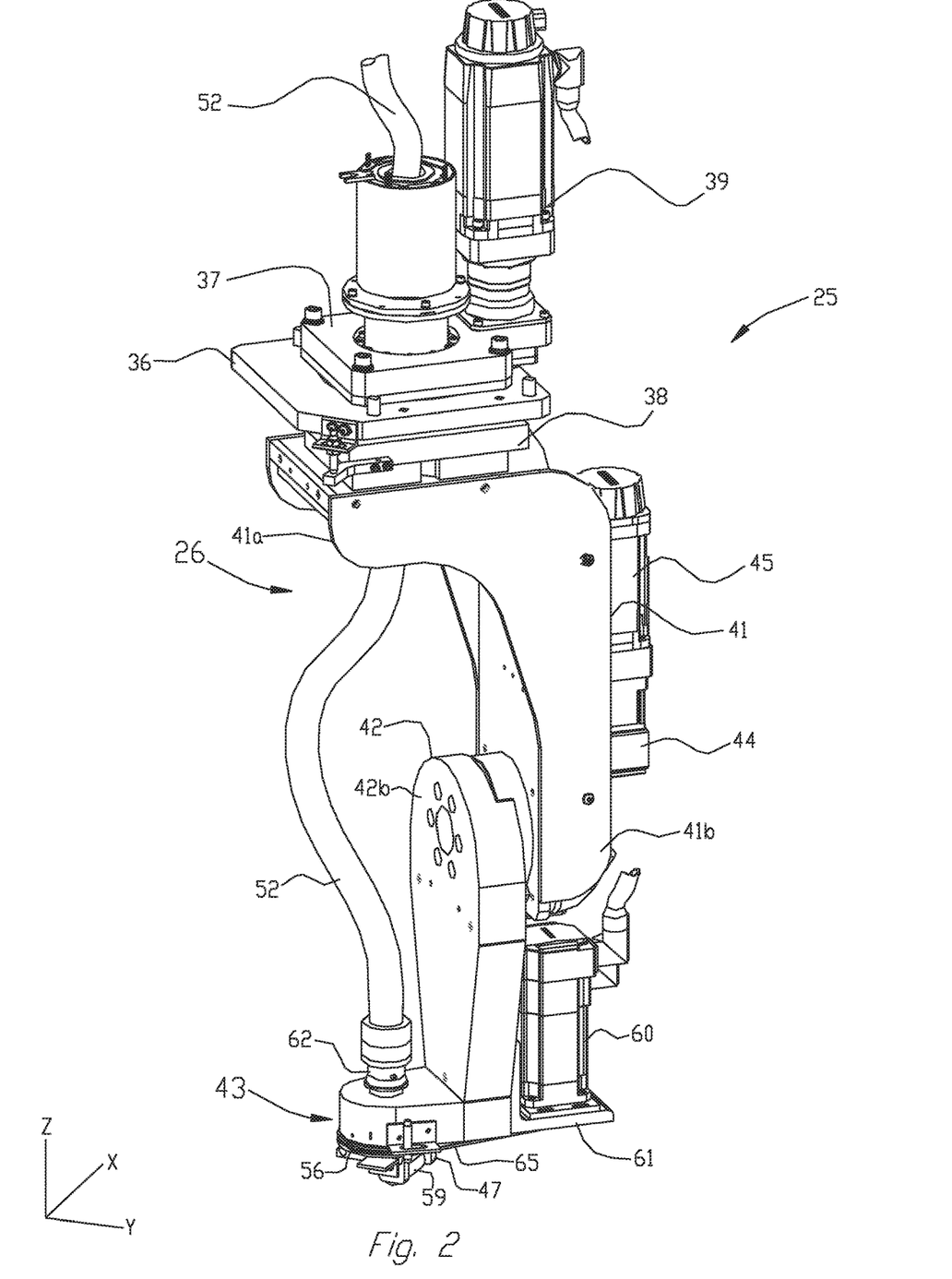
FIG. 2 is an enlarged perspective view of an exemplary carriage and applicator assembly of the exemplary CNC machine shown in FIG. 1.

As best shown in FIG. 2, carrier 25 is provided with a base platform 36, a gear box 37 fixedly mounted on the upper side thereof, and a mounting platform 38 rotatably mounted on the underside of base platform 36. Platform 38 may be provided with openings therethrough disposed along the z-axis of carrier 25. Gear box 37 may be provided with a gear arrangement having an opening therethrough and disposed coaxially with the aligned openings in gear box 37 and platforms 36 and 38, operatively connected to platform 38 for rotation about the Z-axis, and rotatable about such axis by means of a servomotor 39 mounted on base platform 36 and operatively connected to such gear arrangement.

Figure 3:
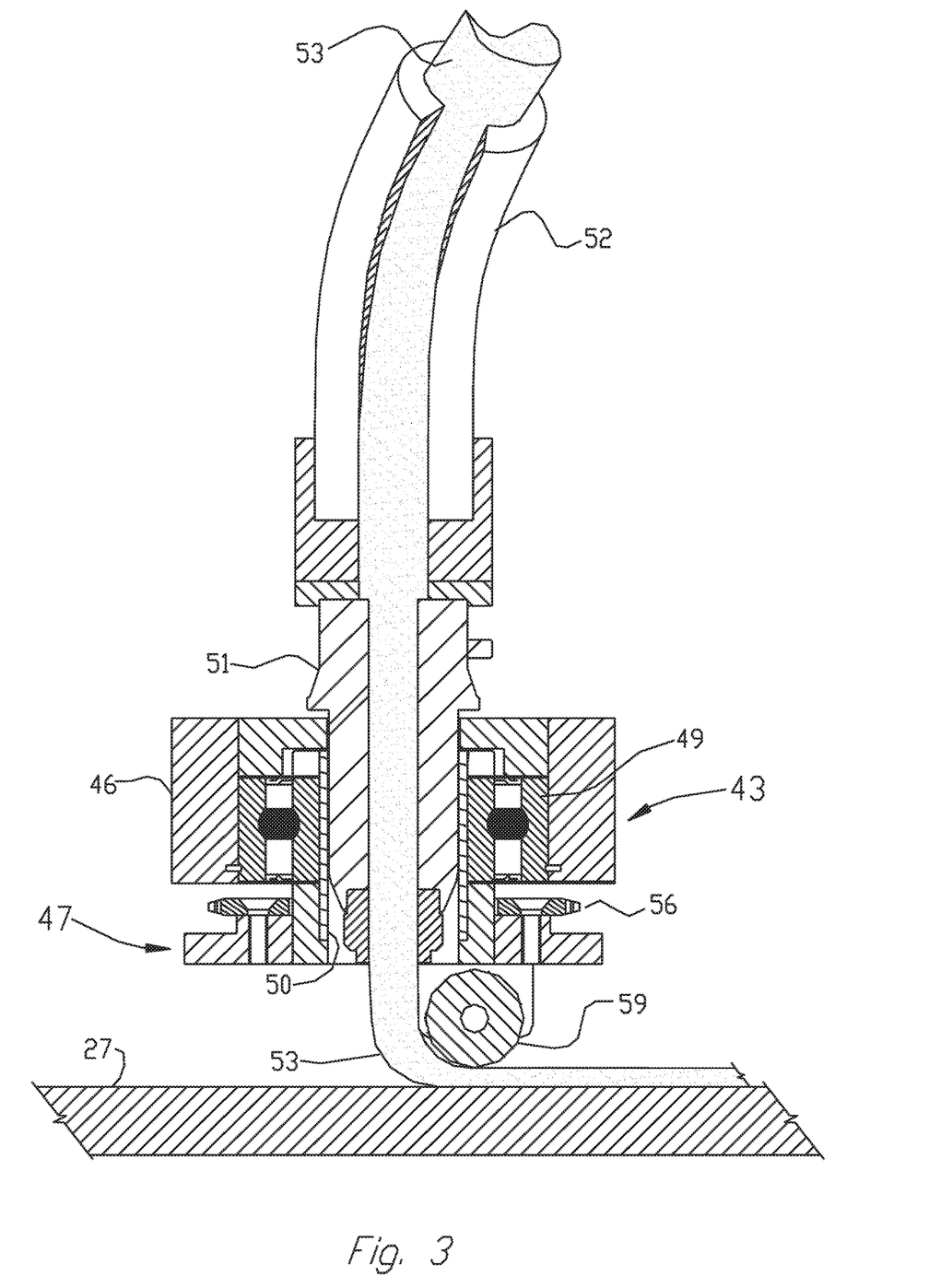
FIG. 3 is an enlarged cross-sectional view of an exemplary material applicator head mounted on a lower end of the applicator assembly of FIG. 2, illustrating a bead of flowable material being extruded through an applicator nozzle onto a work surface, and a roller engaging and compressing a portion of such bead against such work surface, forming a ply of an article being manufactured, according to an aspect of the present disclosure.

Applicator assembly 26 may include an upper segment 41 and a lower segment 42. Upper segment 41 includes a transverse portion 41a secured to the underside of mounting platform 38 for rotational movement about the z-axis. Upper segment 41 may be provided with an opening therethrough along such z-axis, and a depending portion 41b may be disposed substantially parallel relative to such z-axis. Lower segment 42 includes a housing 42b disposed on an inner side of depending portion 41b. Housing 42b may be mounted on a shaft journalled in a lower end of depending portion 41b, intersecting and disposed perpendicular to the z-axis of carrier 25, and further housing 42b may be provided with a laterally projecting applicator head 43 at a free end thereof. Mounted on a gearbox 44 provided on an outer side of depending portion 41b (opposite housing 42b) is a servomotor 45 operatively connected through gearbox 44 to the shaft journalled in depending portion 41b. Servomotor 45 may be configured for pivotally displacing lower segment 42 in a y-z plane. A material tamping roller 59 (shown in FIG. 3), rotatably mounted in carrier bracket 47, provides a means for flattening and leveling a bead of flowable material (e.g., molten thermoplastic), as shown in FIG. 3. Carrier bracket 47 may be adapted to be rotationally displaced by means of a servomotor 60 (shown in FIG. 2), through a sprocket 56 and drive-chain 65 arrangement.

With continuing reference to FIG. 3, applicator head 43 may include a housing 46 with a roller bearing 49 mounted therein. Carrier bracket 47 is fixedly mounted to an adaptor sleeve 50, journalled in bearing 49. As best shown in FIGS. 2-3, a conduit 52 including an elongated, flexible material for conveying, e.g., a molten bead of a flowable material (e.g., molten thermoplastic) under pressure from a source disposed on carrier 25 or another source, to applicator head 43, may be fixedly (or removably) connected to, and in communication with nozzle 51. An intermediate portion of conduit 52 may be routed through the openings through gear box 37, base platform 36 and mounting platform 38, and along the z-axis of carrier 25. In use, the flowable material 53 (e.g., thermoplastic) may be heated sufficiently to form a molten bead thereof, which is then forced through conduit 52 and extruded through applicator nozzle 51, to form multiple rows of deposited material 53 in the form of molten beads, as described herein. Such beads of molten material 53 may be flattened, leveled, and/or fused to adjoining layers by any suitable means, such as, e.g., bead-shaping roller 59, to form an article. Even though bead-shaping roller 59 is depicted as being integral with applicator head 43, bead-shaping roller 50 may be separate and discrete from applicator head 43. In some embodiments, the deposited material 53 may be provided with a suitable reinforcing material, such as, e.g., fibers that facilitate and enhance the fusion of adjacent layers of extruded flowable material 53.

In some examples, machine 1 may include a velocimetry assembly (or multiple velocimetry assemblies) configured to determine flow rates (e.g., velocities and/or volumetric flow rates) of material 53 being delivered from applicator head 43. The velocimetry assembly preferably transmits signals relating to the determined flow rates to the aforementioned controller coupled to machine 1, which may then utilize the received information to compensate for variations in the material flow rates.

In the course of fabricating a component, pursuant to the methods described herein, the control system of the machine 1, in executing the inputted program, would operate the several servomotors as described to displace the gantry 23 along the x-axis, displace the carriage 24 along the y-axis, displace the carrier 25 along a z-axis, pivot lower applicator segment 42 about an axis disposed in an x-y plane and rotate bracket 47 about a z-axis thereof, in accordance with the inputted program, to provide the desired end product or a near duplicate thereof.

Figure 4:
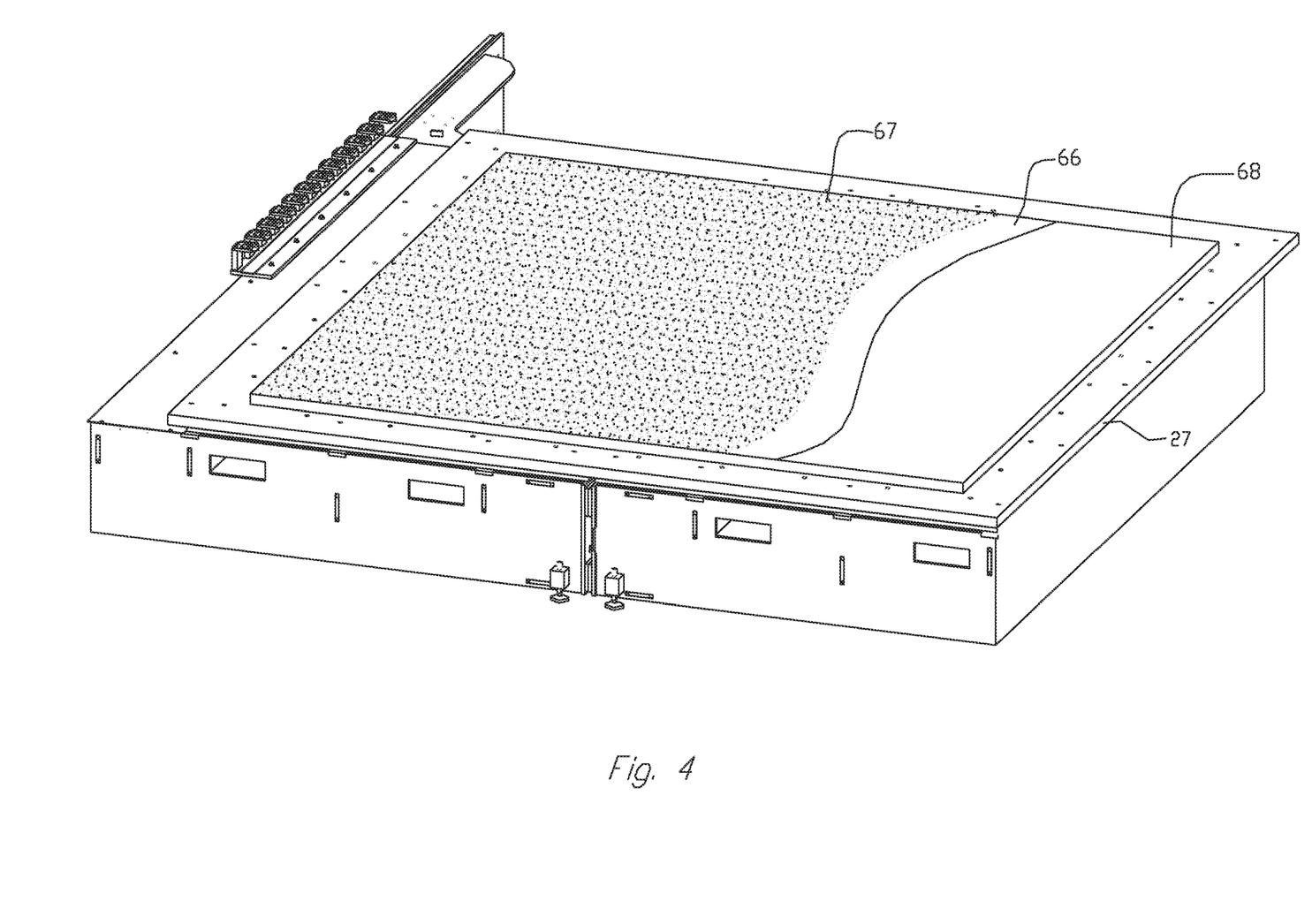
FIG. 4 is a partial perspective view of an exemplary CNC machine base structure, illustrating a stable substructure disposed thereon, coated with a sublayer of adhesive bonding material, and having a top layer of pelletized thermoplastic pellets partially embedded therein, shown in partial cutaway for sake of clarity.

With reference now to FIG. 4, there is depicted an exemplary base member of a CNC machine, illustrating a foundation structure 68, securely mounted to worktable 27. As alluded to above, foundation structure 68 may be, e.g., medium density fiberboard (MDF) or high grade plywood, or any other suitable material known in the art. Foundation structure 68 may be provided with a layer of adhesive material 66, such as, e.g., polyvinyl acetate glue. Adhesive material 66 may be deposited by any suitable manner known in the art. For example, adhesive material 66 may be applied to foundation structure 68 by a brush or one more spray nozzles. Next, and before adhesive material 66 cures or otherwise sets, a plurality of pellets 67 may be deposited thereon. Pellets 67 may be of any suitable material. For example, in one embodiment, pellets 67 may be made of thermoplastic material. The pellets 67 may be deposited on adhesive material 66 such that at least a portion of each pellet 67 is within adhesive material 66, such that the pellets are secured to adhesive material 66 (and, consequently, foundation structure 68) when adhesive material 66 cures or otherwise sets. Those of ordinary skill in the art will understand that the pellets 67 may be deposited in any suitable uniform or non-uniform pattern.

Figure 5:
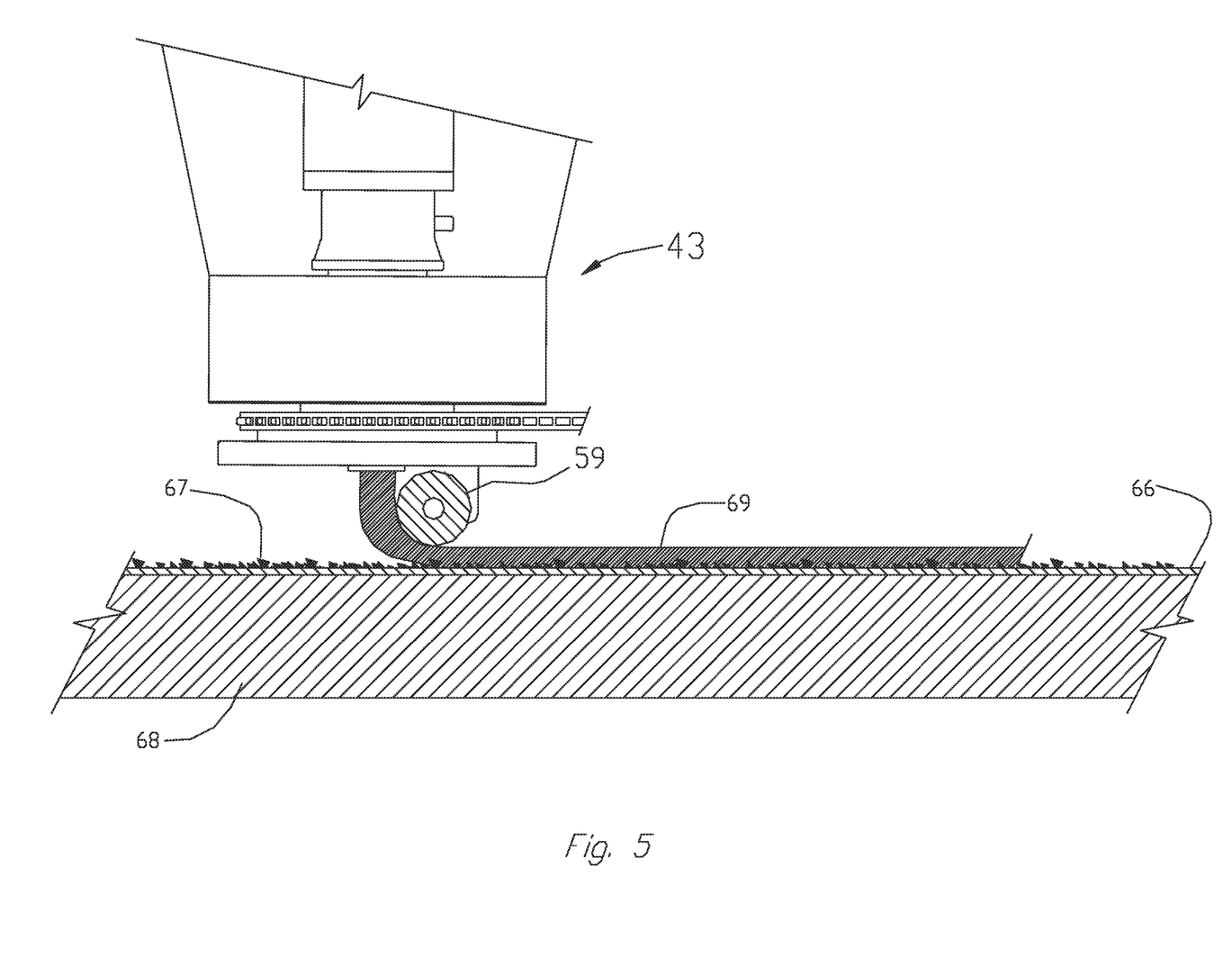
FIG. 5 is a side view of an applicator head, shown in the process of depositing and rolling a bead of molten flowable material (e.g., a thermoplastic material) onto a substructure coated with adhesive bonding material embedded with pellets of the flowable materials (e.g., a thermoplastic material)

Referring now to FIG. 5, with an exemplary CNC machine (e.g., CNC machine 1 depicted in FIG. 1) suitably programmed and activated, based on a selected pattern relating to a part targeted for fabrication, beads of flowable material 69 (which may be like flowable material 53 described above in connection with FIG. 3) may be extruded ahead of the path of roller 59, onto the specially prepared surface of foundation structure 68, comprising pellets 67 of thermoplastic material embedded in a specially prepared and suitable adhesive material 66. That is to say, at least a portion of one or more pellets 67 may remain exposed while a reminder of the at least one pellet is within the adhesive material 66. As alluded to above, the adhesive material 66 exhibits relatively greater flexibility than the foundation structure 68. Thus, a positioning and/or orientation of each pellet 67 may be altered relative to foundation structure 68 without disengaging the pellet 67 from adhesive material 66. As a result of the flowable material 69 being heated, the pellets 67 may partially melt and fuse with the flowable material 69 when the flowable material 69 makes contact with the pellets 67. By partially melting, those of ordinary skill in the art will understand that at least a portion of the pellet 67 will soften or otherwise begin transitioning to a liquid (e.g., flowable) state so that the portion of the pellet 67 may be combined or otherwise join with the flowable material 69. Consequently, the flowable material 69 and pellets 67 become incorporated with one another, thereby bonding the flowable material 69 to the foundation structure 68 via adhesive material 66. The flexibility and elasticity of the adhesive material 66 facilitates the return of the flowable material 69 back to its normal quiescent state upon cooling, without forming stress forces between the flowable material 69 and the substructure 68. Potential stress related warping is thus negated.

Figure 5A:
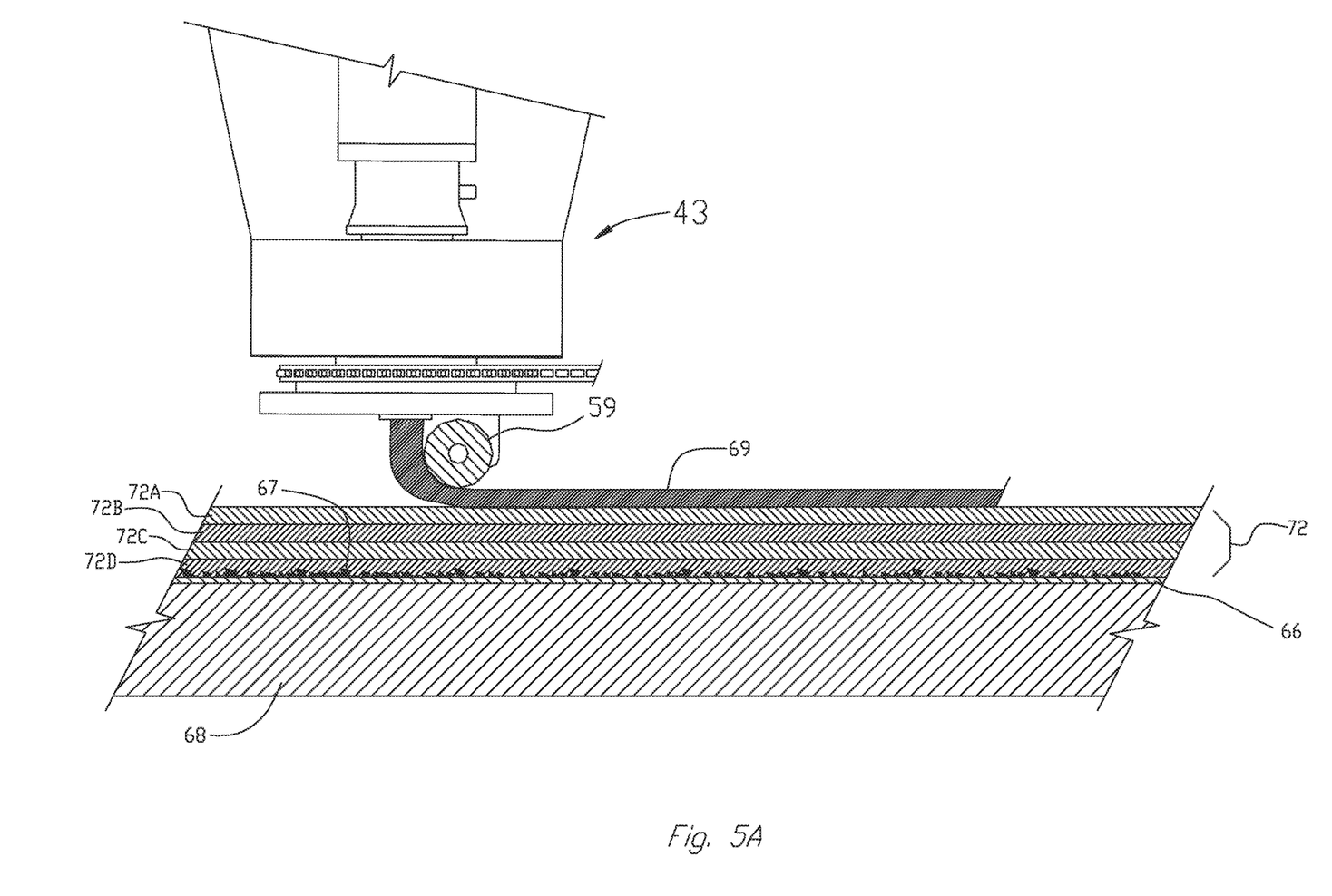
FIG. 5A is a side view of an applicator head, shown in the process of depositing and rolling a bead of molten flowable material (e.g., a thermoplastic material) onto a base comprising a plurality of layers of flowable material (e.g., a thermoplastic material).

Referring now to the embodiment depicted in FIG. 5A, a plurality of layers 72A-72D of a suitable flowable material, such as, e.g., flowable material 69, which may include a thermoplastic material, may be deposited on top of adhesive material 66 and pellets 67. In one instance, the plurality of layers 72A-72D may include two or more layers of flowable material 69. In some embodiments, and as shown in FIG. 5A, the plurality of layers 72A-72D may include at least four layers of flowable material 69 deposited as a foundational base 72 deposited on the foundation structure 68. Base 72 may include layers 72A, 72B, 72C, and 72D. In some embodiments, however, base 72 may include a greater or lesser number of layers, as described in greater detail below. Each of layers 72A-72D may include a thermoplastic material. In some embodiments, the thermoplastic material of layers 72A-72D In alternative embodiments, each layer 72A-72D may include a material having properties similar to a thermoplastic material. Each layer 72A-72D of base 72 may be deposited on the foundation structure 68 before an initial layer of a part targeted for fabrication part is deposited. In some embodiments, foundational base 72 is deposited on foundation structure 68 having thereon a combination of adhesive layer 66 and plurality of pellets 67, as shown in FIG. 5A. More specifically, an adhesive layer 66 and pellets 67 may be interposed between bottommost base layer 72D of base 72 and foundation structure 68 to, e.g., secure the base 72 to the foundational structure 68. Pellets 67 may be made of a thermoplastic material. Those of ordinary skill in the art will readily understand that pellets 67 may be applied to adhesive layer 66 in the same method as described with respect to FIG. 5 above. In alternative embodiments, base 72 may be deposited on foundation structure 68 without adhesive layer 68 and/or pellets 67.

In some embodiments, the minimum four layer base 72 is comprised of the same thermoplastic material as pellets 67. In one embodiment, each of layers 72A-72D of base 72 may include, e.g., 20% carbon fiber filled Acrylonitrile butadiene styrene (ABS). However, those of ordinary skill will readily recognize that the principles of the present disclosure may be utilized with any suitable thermoplastic material.

As alluded to above, an initial layer of flowable material 69 may be deposited upon base 72 to fabricate a component by means of an additive manufacturing process. According to the principles of the present disclosure, therefore, the initial layer of flowable material 69 may be deposited only after layer 72A is completely cooled. Similarly, the initial layer of flowable material 69 may be deposited only after the entirety of base 72 is completely cooled. In addition, each of layers 72A-72C may be deposited only after the prior layer is completely cooled. That is, for example, layer 72C may be deposited only after layer 72D is completely cooled.

Each layer 72A-72D of base 72 may have any suitable thickness. For example, each layer 72A-72D may include a similar thickness. Additionally, or alternatively, one or more layers 72A-72D may include a greater or lesser thickness than one or more of the other layers. In one embodiment, base 72 may include only four layers 72A-72D.

It is contemplated that the number of layers of flowable material 69 in base 72 may be dependent on, among other things, properties of flowable material 69 as well as a temperature of flowable material 69. For example, the number of layers in base 72 may be sufficient to dissipate heat from the first layer of a part targeted for fabrication without melting any layer (e.g., layer 72A) of base 72. In this manner, heat from the flowable material 69 of an initial layer of a part being fabricated does not cause base 72 to melt and securely bond with that initial layer of the part targeted for fabrication. As a result, the part, along with base 72, may be easily separated from foundation structure 68. In one embodiment, it is contemplated that base 72 should include a plurality of layers sufficient to absorb heat from the first layer of a part targeted for fabrication so as to only partially melt base 72 and form a relatively weak bond between base 72 and the first layer of the part, such that the bond is strong enough to hold the two components together during machining, but weak enough to break apart once machining is complete. That is, those of ordinary skill in the art will recognize that the principles of the present invention allow for separating the part from base 72, and/or separating the part and base 72 from foundation structure 68 along the adhesive 66/pellets 67 interface.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

We claim:

1. An additive manufacturing method, the method comprising:
    positioning a removable surface on a worktable;
    applying an adhesive material to the removable surface;
    depositing a plurality of pellets into the adhesive material, wherein at least a portion of each pellet of the plurality of pellets remains exposed forming an uneven surface that protrudes from a surface of the adhesive material;
    depositing a first plurality of layers of a first flowable material on the uneven surface of at least some of the plurality of pellets, wherein the first flowable material is heated prior to depositing the first flowable material on the plurality of pellets such that depositing the first flowable material on the plurality of pellets causes at least one pellet of the plurality of pellets to at least partially melt;
    depositing a second plurality of layers of a second flowable material on the first plurality of layers; and
    separating the second plurality of layers from the first plurality of layers.

2. The additive manufacturing method of claim 1, wherein the first flowable material is a thermoplastic material and each pellet of the plurality of pellets comprises a same thermoplastic material as the first flowable material.

3. The additive manufacturing method of claim 1, wherein the first plurality of layers includes at least four layers.

4. The additive manufacturing method of claim 1, wherein the first flowable material is a different material than the second flowable material.

5. The additive manufacturing method of claim 1, wherein the removable surface includes one of medium density fiberboard (MDF) or high grade plywood.

6. The additive manufacturing method of claim 1, further comprising the step of:
    cooling the first flowable material after the first flowable material is deposited on the plurality of pellets.

7. The additive manufacturing method of claim 1, wherein the first flowable material includes a reinforcing material embedded therein.

8. The additive manufacturing method of claim 7, wherein the reinforcing material includes strands of fiber.

9. The additive manufacturing method of claim 1, wherein depositing the second plurality of layers of the second flowable material includes fusing a layer of the second flowable material to an adjacent previously deposited layer of the second flowable material.

10. The additive manufacturing method of claim 1, wherein the first flowable material is deposited from a nozzle of a programmable computer numeric control (CNC) machine.

11. The additive manufacturing method of claim 1, wherein depositing the second plurality of layers of the second flowable material includes depositing the second flowable material in a pattern, wherein the pattern is based on a digital representation of a component.

12. An additive manufacturing method, the method comprising:
    positioning a removable surface on a worktable;
    applying an adhesive material to the removable surface;
    depositing a plurality of pellets into the adhesive material, wherein at least a portion of each pellet of the plurality of pellets remains exposed forming an uneven surface that protrudes from a surface of the adhesive material;
    depositing a first plurality of layers of a flowable material on the uneven surface of at least some of the plurality of pellets, wherein the flowable material of the first plurality of layers is a thermoplastic material and each pellet of the plurality of pellets includes a same thermoplastic material as the thermoplastic material of the first plurality of layers;
    depositing a second plurality of layers of the flowable material on the first plurality of layers; and
    separating the first plurality of layers from the removable surface along an interface between the adhesive material and the plurality of pellets.

13. The additive manufacturing method of claim 12, wherein depositing the flowable material on the plurality of pellets causes at least one pellet of the plurality of pellets to at least partially melt.

14. An additive manufacturing method, the method comprising:
- positioning a removable surface on a worktable;
- applying an adhesive material to the removable surface;
- depositing a plurality of pellets into the adhesive material, wherein at least a portion of each pellet of the plurality of pellets remains exposed forming an uneven surface that protrudes from a surface of the adhesive material;
- depositing a first plurality of layers of a first flowable material on the uneven surface of at least some of the plurality of pellets so as to cause at least one pellet of the plurality of pellets to at least partially melt; and
- depositing a second plurality of layers of a second flowable material on the first plurality of layers, wherein the first flowable material is different from the second flowable material.

15. The additive manufacturing method of claim 1, further including machining a part that includes the second plurality of layers, wherein separating the second plurality of layers from the first plurality of layers is performed after the machining.

16. The additive manufacturing method of claim 12, wherein the plurality of pellets are deposited in the adhesive material after the adhesive material is applied to the removable surface.

\* \* \* \* \*